United States Patent [19]

Tavares et al.

[11] Patent Number: 5,247,684
[45] Date of Patent: Sep. 21, 1993

[54] LIGHT UPDATE NOTIFICATION MECHANISM FOR SHARED DATA STRUCTURES

[75] Inventors: Carlos M. Tavares, Somerset; Durval M. Tavares, Dighton, both of Mass.

[73] Assignee: The United States of America as represented by the Secretary of the Navy, Washington, D.C.

[21] Appl. No.: 770,207

[22] Filed: Oct. 3, 1991

[51] Int. Cl.⁵ .............................................. G06F 15/40
[52] U.S. Cl. .................................... 395/700; 364/962; 364/962.1; 364/969.2; 364/969.4; 364/DIG. 2
[58] Field of Search ............. 395/700; 364/962, 962.1, 364/969.2, 969.4, DIG. 2

[56] References Cited

U.S. PATENT DOCUMENTS 4,441,163  4/1984  Leikam et al. ..................... 364/900
5,151,988  9/1992  Yamagishi ........................... 395/600

Primary Examiner—Gareth D. Shaw
Assistant Examiner—A. Katbab
Attorney, Agent, or Firm—Michael J. McGowan; Prithvi C. Lall; Michael F. Oglo

[57] ABSTRACT

A system for updating and reading a data base utilizes a pair of counters working in conjunction with registers located within RAM to enable one upon reading the data base to know if a data base record has been added, deleted, or revised. The system also notifies if the data base is being updated on attempting a read process or during the reading. The updating is performed by a writer that is never inhibited from updating the data base.

6 Claims, 3 Drawing Sheets

LIGHT UPDATE NOTIFICATION MECHANISM FOR SHARED DATA STRUCTURES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

The present invention relates to the reading and writing of data in a processing system. More particularly the invention provides a low overhead update notification mechanism for concurrent processes accessing data bases.

(2) Description of the Prior Art

A known prior art means utilizes an interrupt method in which submarine combat system processes notify each other of their updates to shared resources by using soft interrupts (versus hardware interrupts). These soft interrupts provide inter process update notification. The typical computing system has the interrupting processes (via kernel services) either set conditional flags or queue the conditions, and either asynchronously or synchronously has the interruptible processes (via the operating system) either check the flag or the queue for any interrupting conditions. When a condition exists the operating system invokes interrupt handlers. The interrupt handlers are procedures provided by the executing programs for activation on interrupts. More specifically, processes generate interrupts for other processes by calling the operating system at least once per interrupt. Each call initiates the operating system accesses and updates interrupt natured data structures in the target process. The operating system then allows the interrupts when an interrupt returns true and the process is either in the execution state or in the ready state. The operating system handles the interrupt by placing a handler frame (a call) on the stack. The state of the art, from interrupt generation to handler invocation, requires processing overhead and incurs response latencies. The delays are due to activities that must run to completion before interrupt conditions are acknowledged, which in turn are due to switching to and from the operating system and processes.

Another prior art means utilizes a synchronization method. In this method submarine combat system processes notify each other of their updates to shared resources by invoking synchronization primitives. These primitives are often termed "P" and "V", or "Signal" and "Wait", or "Lock" and "Unlock." When P and V, and Signal and Wait primitives are used, they are implemented as operating system services that require the process surrender the computer system to the operating system. The client does a P/Wait when it needs the update notification and the writer does a V/Signal when it generates the update notification. Each time a process invokes either a P or a V, it will call the operating system at least once per that invocation. This switching to and from the operating system causes P and V primitives to introduce substantial overhead. In addition, P invocations indiscriminately cause writer(s) and reader(s) to wait serially for the resource. The P primitive may also affect the behavior of a priority based real-time system. On some operating systems, P invocations have a tendency of creating a priority inversion when separate priority queues are not maintained for waiting processes. The absence of priority queues treats all processes as equal activities.

P and V primitives are often based on Lock and Unlock operators. Lock and Unlock operators are often directly based on some computer hardware mechanism. In practice, a successful lock allows a process to access the resource; an unsuccessful lock requires the process to re-invoke the lock operator. Many computer systems make Lock and Unlock operators directly available to processes, i.e., they don't require P and V calls, and operating system intervention. Processing of unsuccessful locks is accomplished by having the process either re-invoke the lock until success, or by having it block and continue at some later time, or by having it perform a default action. The reinvoking of the lock is often called a spin-lock and involves busy waiting and hence wastes precious computer system processor cycles. The blocking process as a strategy usually creates the same effect as the P operation, i.e., it serializes access. Unlike the P primitive, the lock operator doesn't have to result in suspended processing, but often default actions are not available when data must be accessed and processed.

Submarine combat systems can conceptually be characterized as a processing pipeline with the flow being occasionally broken by human operator actions. Two generic processing structures in submarine combat systems are manifest when this conceptual model is applied. The progression from data to information usually has many processes feeding many other processes as multiple processing stages. The data bases shared to pipe data from one stage to another stage usually have one writer to each data base, or some set of records in it, and several readers accessing the data bases. This processing structure represents the first category, and the focus of the invention. The second category is another processing structure where the computer system of a submarine combat system operates on data for, presents information to, and assists the actions of its human operators. Many of these actions often result in a break in the combat system processing pipeline. Often access to data bases is necessary, processes acting on the human operator's behalf may require sole access to either select data bases or sets of data base records. This often requires synchronization with writers in some stage of the processing pipeline. This latter processing scenario requires either the P/V or the Lock/Unlock solutions.

SUMMARY OF THE INVENTION

Accordingly, it is a general purpose and object of the present invention to provide an improved access of a data base that is subject to being updated at any time. It is a further object that the read portion of the system is aware of this updating if it is reading the data base when the updating occurs. Another object is that the system be able to tell the nature of an updating that occurred. Further objects are that the system be inexpensive, and easy to operate and understand.

These objects are accomplished with the present invention by providing a computer system in which a data base can be updated at any time. Several counters are used to accomplish this. Through comparison of the value of the counters the reading portion of the system is inhibited from commencing to read the data base during an update. In addition, the value of the counters informs the read portion of an update to the data base when the read subroutine has commenced prior to the update and the update subroutine has commenced prior to the completion of the read step. The reading portion of the system is also capable of determining what type of prior updating occurred,

DESCRIPTION OF THE PREFERRED EMBODIMENT

Computer systems used to prototype and implement various systems must support and execute multiple concurrent processes (programs in execution) in their hardware and software. These computer processes monitor, model, simulate and control world processes and objects.

Figures 2A, 2B:
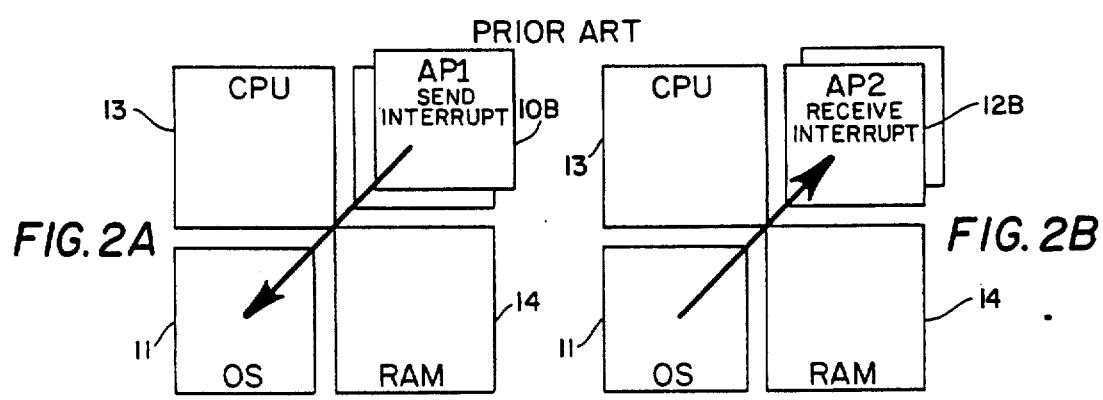
FIG. 2A and 2B are such representations of a second prior art means for the processing of operations among the system components.
Figures 3A, 3B:
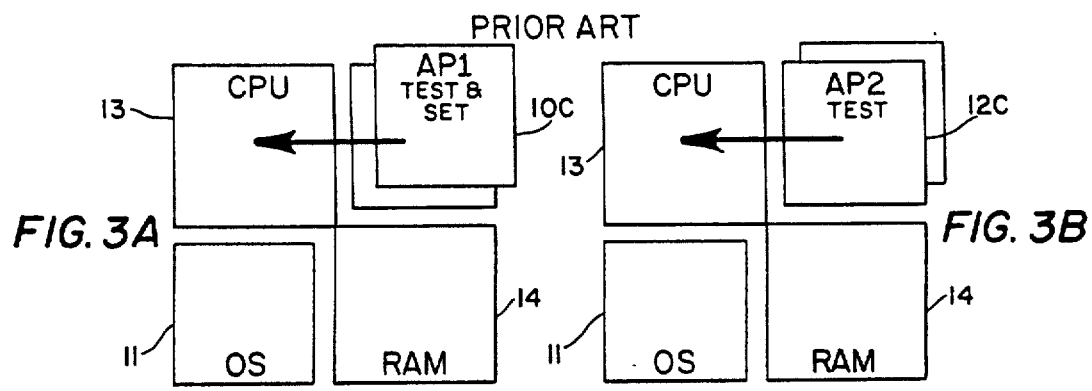
FIG. 3A and 3B are such representations of a third prior art means for the processing of operations among the system components.
Figures 4A, 4B:
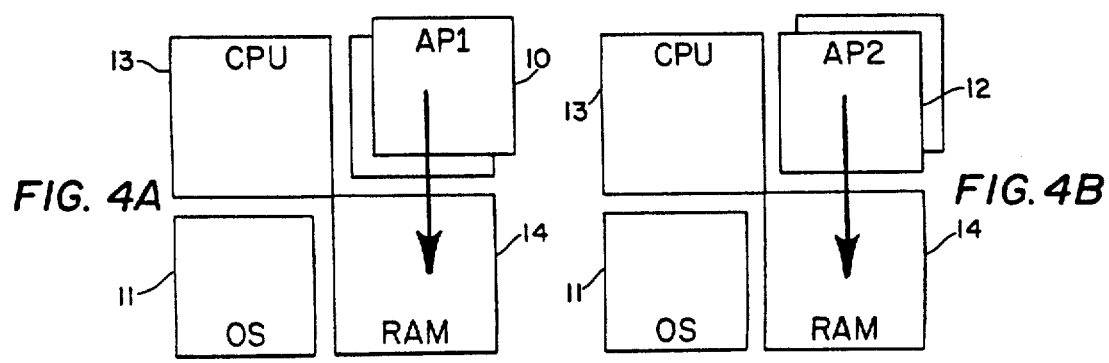
FIG. 4A and 4B are diagrammatic representations of the present inventive means for the processing of operations among the system components.

Each pair of FIGS. 1A and 1B, 2A and 2B, 3A and 3B represent a prior art system. FIGS. 4A and 4B represent the present invention. The way to interpret these figures is to use two simple rules. Arrows pointing in either the horizontal or the vertical direction represent inexpensive processing of operations among the system components (the operating system (OS) 11, the central processing unit (CPU) 13, the random access memory (RAM) 14, and application programs (AP#)10, 10a, 10b, 10c, 12, 12a, 12b, and 12c). In the foregoing, the term "inexpensive processing" generally refers to conservation of computer system processing cycles. The OS 11, CPU 13, and RAM 14 may or may not be the same in each of the figures depending upon the designers selection of components. The AP#10, 10a, 10b, , 10c, 12, 12a, 12b, and 12c also may differ from each other. Arrows pointing in the diagonal direction represent expensive processing necessary to carry update notification operations. Diagonal processing requires hundreds of microseconds, while horizontal and vertical processing require a fraction of a micro second. The operating system 11 and application programs 10, 10a, 10b, 10c, 12, 12a, 12b, and 12c can easily exercise the CPU 13 and RAM 14 hardware components. In comparison, it requires many operations for the operating system 11 and application programs 10, 10a, 10b, 10c, 12, 12a, 12b, and 12c to exercise each other. It usually requires that the state/context of programs be saved and that many control modules be invoked in the operating system. In the illustrations the CPU 13 and RAM 14 boxes touch each other, these components are closely linked and are often inseparable, e.g., all CPU 13 instructions come from memory 14 and usually operate on memory 14. The operating system 11 and the application programs 10, 10a, 10b, 10c, 12, 12a, 12b, and 12c exercise the CPU 13 and the RAM 14 constantly, the horizontal and the vertical arrows indicate the components focused on by the operations, versus the details of the operations. The arrows signify the degree or criticality of that system component in accomplishing update notifications. Note that the illustrations implicitly demonstrate an approach for update notification not explored by the prior art techniques. In the prior art notification occurred in the diagonal and the horizontal but never in the vertical as occurs in the present invention.

Figures 1A, 1B:
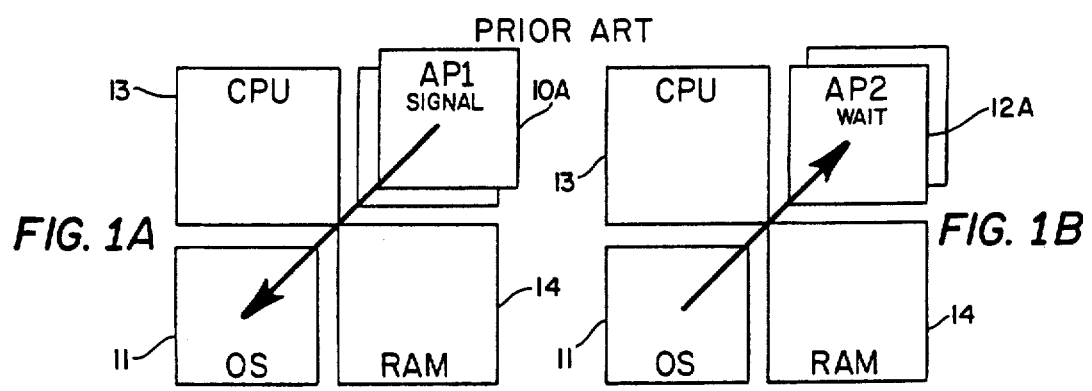
FIG. 1A and 1B are diagrammatic representations of a first prior art means for the processing of operations among the system components.

FIGS. 1A and 1B show that AP1 10a notifies AP2 12a via OS 11 by using the signal and wait synchronization primitives. FIGS. 2A and 2B show that AP1 10b notifies AP2 12b Via OS 11 by sending an interrupt that is handled by AP2's handler. FIGS. 3A and 3B show that AP1 10c notifies AP2 12c via a CPU 13 atomic lock operator (a.k.a. test and set instruction). The above three examples refer to prior art systems.

FIGS. 4A and 4B show the present invention in which AP1 10 notifies AP2 12 via RAM 14 based counters/registers (a.k.a. variables).

Figure 5:
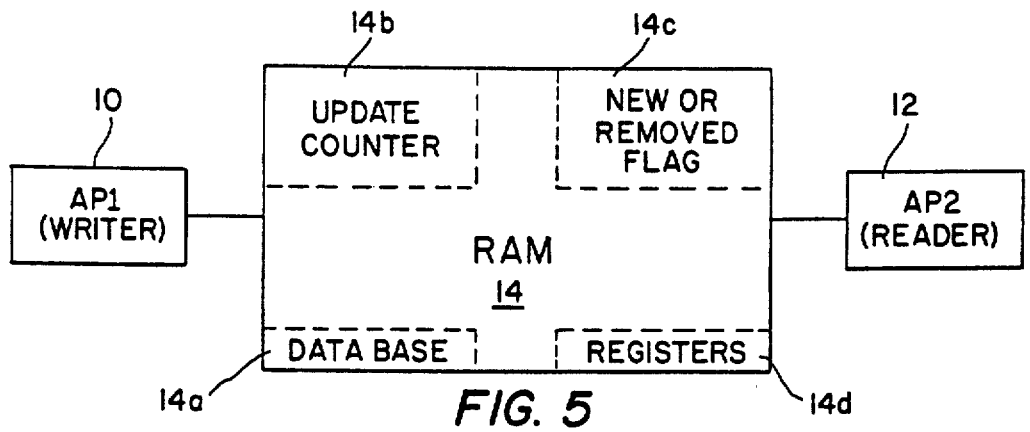
FIG. 5 is a block diagram of an update notification system in accordance with the present invention as represented in FIGS. 4A and 4B.

Referring now to FIG. 5 there is shown in the present invention the application program (AP1) 10 and the application program (AP2) 12 connected to RAM 14. The RAM 14 comprises a data base record 14a, a first counter 14b designated update-counter, a second counter 14c designated new-or-removed-flag and a plurality of registers 14d. The writer AP1 10 modifies the data base record 14a, and increments each of the counters 14b and 14c. The reader AP2 12 reads data base 14a and performs operations, to be explained later, on counters 14b and 14c and the plurality of registers 14d.

Figure 6:
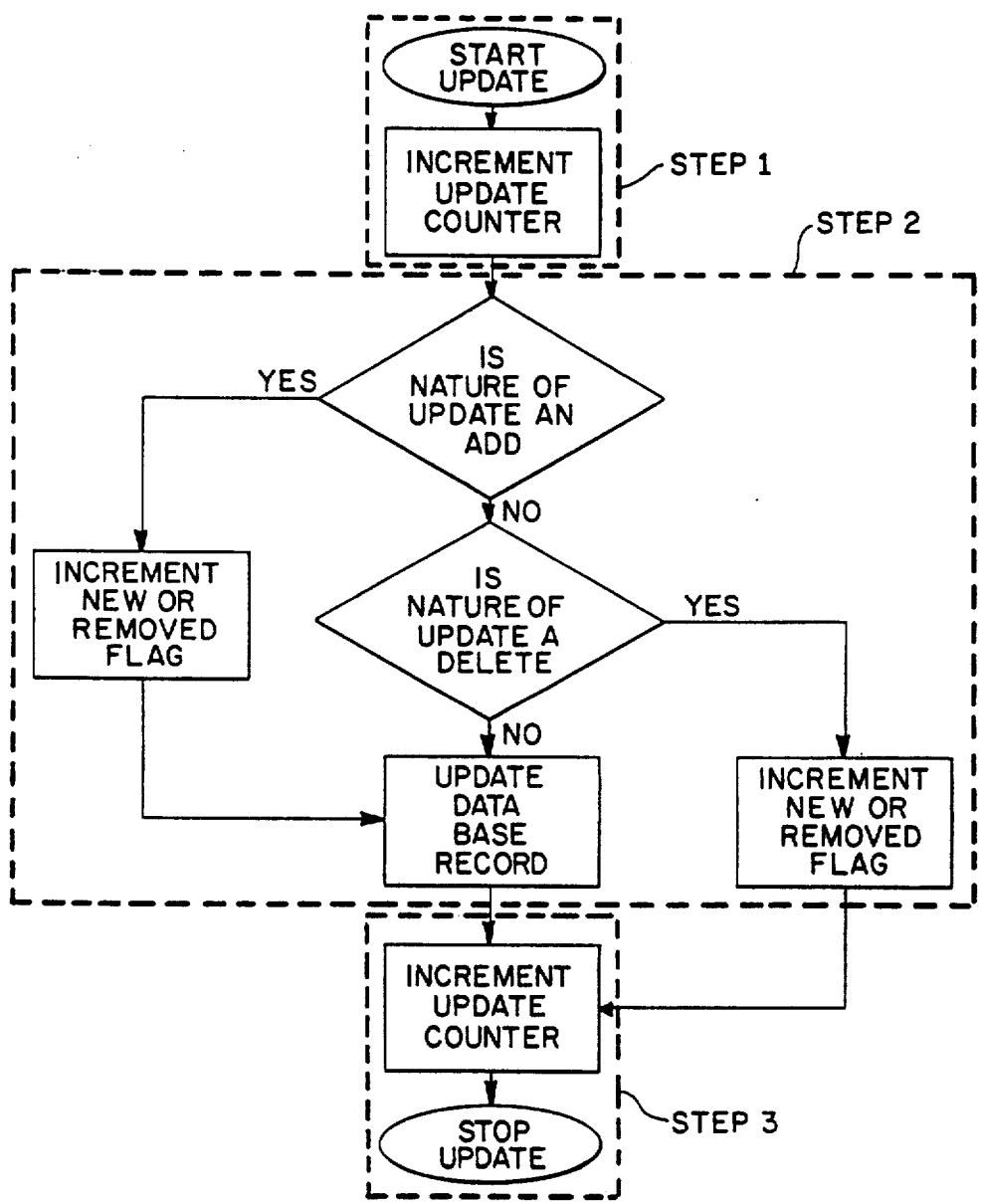
FIG. 6 is a flow diagram of the updating of the data base in the update notification system of FIG. 5.
Figure 7:
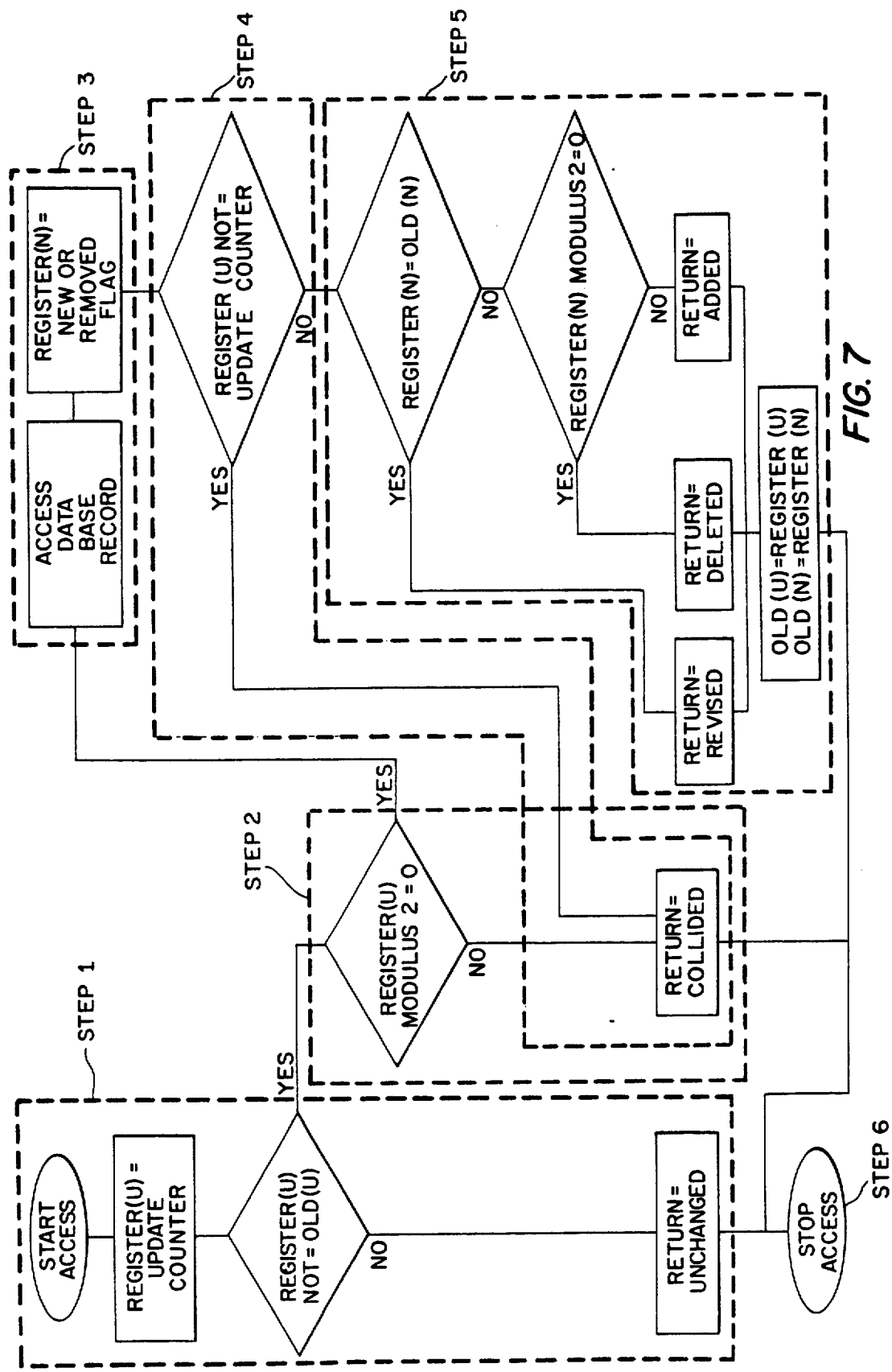
FIG. 7 is a flow diagram of the reading of the data base in the update notification system of FIG. 6.

FIG. 6 is a flow diagram for the operation of the writer 10. FIG. 7 is a flow diagram for the operation of the reader 12. While only one reader 12 is shown in the drawings, it is to be understood multiple readers 12 with associated identical flow diagrams could be used. In addition, multiple data base records 14a could be used.

The invention is the application of sets of two counters 14b and 14c for the update notification to multiple computer system processes accessing at least one shared data base record 14a in: (i) submarine combat systems, (ii) other military real time tactical command and control systems, (iii) semi-automated urban rapid transit train dispatch and schedule modification systems, (iv) real time semiautomatic industrial process, power plant, or power distribution control systems, and (v) the like. The application of two counters 14b and 14c per data base record 14a, allows combinations of writer 10 and reader(s) 12 to share data base record(s) 14a. The registers 14d used in conjunction with the update-counter 14b are the update-counter register designated register (U), the register having the value of register (U) prior to the present access transaction is designated old (U).

The registers 14d used in conjunction with the new-or-removed-flag 14c are the new-or-removed-flag register designated register (N), the register having the value of register (N) prior to the present access transaction is designated old (N).

The FIG. 6 logic for the writer 10 is as follows:

Step 1: the writer 10 increments by one the update-counter 14b.

Step 2: the writer 10 provides the following elementary subroutines:

when adding a record it increments by one the new-or-removed flag 14c, and updates the data base record 14a.

when revising the record it does not increment the new-or-removed-flag 14c, and updates the data base record 14a.

when deleting a record it increments by one the new-or-removed-flag 14c.

However in the present use of the invention the storage for the record is never deleted and is reallocated to a future add.

Step 3: the writer increments by one the update-counter 14b.

It is to be noted from the above that when the writer 10 is updating the data base record 14a, the update-counter 14b has been updated by an increment of one. Following the updating by the writer 10 the update-counter 14b has been incremented by a total of two, and when adding or deleting a record the new-or-remove-flag 14c has been incremented by one, but the new-or-remove-flag 14c has not been incremented when the record has been revised.

The FIG. 7 logic for the reader 12 is as follows:

Step 1
set register (U) equal to the update-counter 14b;
check if the register (U) is not equal to the old (U), if not equal than proceed to step 2, else the return value is unchanged record, and proceed to step 6.

In order to proceed from step 1 to step 2 the writer 10 must have incremented the update-counter 14b. Otherwise go to step 6.

Step 2
check if register (U) modulus 2 is equal to zero, if zero then proceed to step 3, else the return value is collided on access to record, and proceed to step 6.

In order to proceed from step 2 to step 3 the writer 10 must have incremented the update-counter 14b an even number of times. This shows the updating was completed. A value of one indicates the writer is updating the data base record 14a. In this case the system proceeds to step 6.

Step 3
access the data base record 14a; and
set register (N) equal to new-or-removed-flag 14c and proceed to step 4.

Step 4
check if register (U) is not equal to update-counter 14b, whereupon if not equal the return value is collided on record and proceed to step 6, or else proceed to step 5.

If the register (U) is equal to the update-counter 14b then the access was successful. If they are not equal then the writer 10 was modifying the data base record 12a during access. Step 4 always guarantees the determination of the writer 10 during step 3. It is necessary that the computer memory hierarchy maintain the true value of counters 14b and 14c throughout the hierarchy.

Step 5
check if register (N) is equal to old (N), if equal then the return value is "revised record," else check if register N modulus 2 is zero, if zero then the return value is "deleted record," else the return value is "added record;" set old (U) equal to register (U); set old (N) equal to register (N); and proceed to step 6.

Step 6
before returning to step 1, either defer processing to some other time or take other/default action.

There has therefore been described a means of providing update notification between a writer 10 and one or more readers 12. An advantage is that the writer 10 is never inhibited from updating the data base record 14a, i.e., the writer 10 never has to queue for the data base record 14a. The reader 12 can access the data base record 14a at will, deferring processing or taking alternate actions during collisions. The writer 10 indicates to the readers 12 Whether the record is unchanged, collided, added, updated or deleted. Except for collisions operating system intervention is never required. The absence of intervention reduces overhead substantially. Collisions can be processed by requesting the operating system to queue the process for the processor at priority, thus eliminating the possible priority inversion caused by the P primitive.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A method of providing a low overhead update notification for concurrent processes sharing RAM within a computer system comprising the steps of:
incrementing by one an update-counter within said computer system;
determining if nature of an update is adding a record;
incrementing by one a new-or-removed-flag counter within said computer system when nature of an update is adding a record;
updating a data base record when nature of update is one of adding a record and revising a record;
determining if nature of said update is deleting a record when nature of update is not adding a record;
incrementing by one said new-or-removed-flag counter when nature of said update is deleting a record;
incrementing by one said update-counter;
setting a register (U) within said computer system equal to said update-counter;
checking if said register (U) is not equal to old (U);
taking alternative action and canceling the remaining steps if said register (U) was equal to said old (U);
checking if a register (U) modulus 2 is equal to zero if said register (U) was not equal to said old (U);
taking alternative action and canceling the remaining steps if said register (U) modulus 2 was not equal to zero;
accessing said data base record if said register (U) modulus 2 was equal to zero;
setting a register (N) equal to said new-or-removed flag counter;
checking if said register (U) is not equal to said update-counter;
taking alternative action and canceling the remaining steps if said register (U) is not equal to said update-counter;
checking if said register (N) is equal to old (N) if said register (U) is equal to said update-counter;
indicating revised record if said register (N) is equal to old (N);
checking if register (N) modulus 2 is equal to zero if register (N) is not equal to old (N);
indicating deleted record if register (N) modulus 2 is equal to zero;

indicating added record if register (N) modulus 2 is not equal to zero:

setting old (U) equal to register (U); and setting old (N) equal to register (N).

2. A method for providing low overhead update notification for concurrent processes in data structures according to claim 1, wherein such concurrent processes include a writer processing entity to achieve the step of updating a data base record.

3. A method for providing low overhead update notification for concurrent processes in data structures according to claim 2, wherein such concurrent processes further include at least one reader processing entity to achieve the step of accessing said data base record.

4. A method of providing a low overhead update notification for concurrent processes sharing RAM within a computer system comprising the steps of:

updating a data base record with a writer within said computer system by means of one of adding, deleting and revising a record;

incrementing two counters within said computer system a predetermined number of times dependent on which one of said adding, said deleting, said revising a record is performed, and whether said updating of said data base record is still in progress;

attempting access of said data base record with a reader and determining by the numerical value of one of said two counters whether said updating of said data base record is still in progress;

inhibiting access of said data base record with said reader upon said updating of said data base record being in progress;

accessing of said data base record with said reader upon said step of updating of said data base record with said writer being completed; and permitting a new updating of said data base record with said writer upon one of said accessing of said data base record with said reader being still in progress and said accessing of said data base record with said reader being completed.

5. A method of providing a low overhead update notification for concurrent processes within a computer system according to claim 4 further comprising the step of:

indicating a collision when said new updating of said data base record with said writer occurs during said accessing of said data base record with said reader.

6. A method of providing low overhead update notification for concurrent processes within a computer system according to claim 5 further comprising the step of:

indicating which one of said adding, deleting, and revising a record with said writer occurred prior to said step of accessing of said data base record with said reader when there is the absence of said step of indicating a collision.

* * * * *